United States Patent
Narayanan et al.

(10) Patent No.: US 11,079,958 B2
(45) Date of Patent: Aug. 3, 2021

(54) APPARATUS, SYSTEM AND METHOD FOR OFFLOADING DATA TRANSFER OPERATIONS BETWEEN SOURCE AND DESTINATION STORAGE DEVICES TO A HARDWARE ACCELERATOR

(71) Applicant: INTEL CORPORATION, Santa Clara, CA (US)

(72) Inventors: Divya Narayanan, Hillsboro, OR (US); Jawad B. Khan, Portland, OR (US); Michael D. Nelson, Mountain View, CA (US); Akshay G. Pethe, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 16/383,490

(22) Filed: Apr. 12, 2019

(65) Prior Publication Data

US 2019/0243571 A1 Aug. 8, 2019

(51) Int. Cl.
*G06F 3/06* (2006.01)

(52) U.S. Cl.
CPC .......... *G06F 3/0646* (2013.01); *G06F 3/0604* (2013.01); *G06F 3/0659* (2013.01); *G06F 3/0683* (2013.01)

(58) Field of Classification Search
CPC .... G06F 3/0646; G06F 3/0604; G06F 3/0683; G06F 3/0659; G06F 3/0673; G06F 3/0656; G06F 3/0647
See application file for complete search history.

(56) References Cited

U.S. PATENT DOCUMENTS 6,604,067 B1 * 8/2003 Abraham ................ G06F 30/30
  703/21
6,646,646 B2 * 11/2003 Peterson ............. G06F 12/0292
  345/531

(Continued)

OTHER PUBLICATIONS

GeeksforGeeks, "Parallel processing—systolic arrays", Mar. 8, 2018, pp. 1-5, https://www.geeksforgeeks.org/parallel-processing-systolic-arrays/ (Year: 2018).*

(Continued)

*Primary Examiner* — Christopher D Birkhimer
(74) *Attorney, Agent, or Firm* — Compass IP Law PC

(57) ABSTRACT

Provided are an apparatus, system and method for offloading data transfer operations between source and destination storage devices to a hardware accelerator. The hardware accelerator includes a memory space and control logic to receive, from a host processor, a command descriptor indicating at least one source storage device having transfer data to transfer to at least one destination storage device and a computational task to perform on the transfer data. The control logic sends read commands to the at least one source storage device to read the transfer data to at least one read buffer in the memory space and performs the computational task on the transfer data to produce modified transfer data. The control logic writes the modified transfer data to at least one write buffer in the memory space to cause the modified transfer data to be written to the at least one destination storage device.

25 Claims, 8 Drawing Sheets

(56) References Cited

U.S. PATENT DOCUMENTS

| | | | | |
|---|---|---|---|---|
| 6,772,106 | B1* | 8/2004 | Mahlke | G06F 8/447 703/21 |
| 7,152,122 | B2* | 12/2006 | Kagan | G06F 13/1605 709/250 |
| 7,409,473 | B2* | 8/2008 | Conley | G11C 16/26 710/31 |
| 7,603,429 | B2* | 10/2009 | Kagan | G06F 9/546 370/389 |
| 7,676,597 | B2* | 3/2010 | Kagan | G06F 13/1605 709/240 |
| 7,930,437 | B2* | 4/2011 | Kagan | G06F 9/546 709/250 |
| 8,019,902 | B2* | 9/2011 | Kagan | H04L 69/12 709/250 |
| 8,051,212 | B2* | 11/2011 | Kagan | G06F 13/1605 709/250 |
| 8,375,145 | B2* | 2/2013 | Kagan | G06F 13/1605 709/250 |
| 9,348,711 | B2* | 5/2016 | Kobayashi | G06F 11/14 |
| 9,646,243 | B1* | 5/2017 | Gokmen | G06N 3/0454 |
| 9,715,656 | B1* | 7/2017 | Gokmen | G06N 3/08 |
| 9,811,274 | B2* | 11/2017 | Kanai | G06F 3/067 |
| 9,811,497 | B2* | 11/2017 | Li | G06F 13/4234 |
| 10,127,162 | B2* | 11/2018 | Bhatt | G06F 13/4027 |
| 10,164,179 | B2* | 12/2018 | Brew | H01L 45/146 |
| 10,216,418 | B2* | 2/2019 | Choi | G06F 3/0608 |
| 10,248,907 | B2* | 4/2019 | Gokmen | G06N 3/0472 |
| 2002/0070941 | A1* | 6/2002 | Peterson | G09G 5/363 345/544 |
| 2002/0165897 | A1* | 11/2002 | Kagan | G06F 13/1605 718/102 |
| 2006/0136687 | A1* | 6/2006 | Conley | G11C 16/10 711/162 |
| 2006/0168086 | A1* | 7/2006 | Kagan | G06F 13/1605 709/207 |
| 2007/0041050 | A1* | 2/2007 | Wang | G11C 7/1087 358/1.16 |
| 2008/0263302 | A1* | 10/2008 | Balluchi | G11C 7/1078 711/167 |
| 2009/0006655 | A1* | 1/2009 | Kagan | G06F 13/1605 709/250 |
| 2009/0182900 | A1* | 7/2009 | Kagan | H04L 49/90 709/250 |
| 2011/0161784 | A1* | 6/2011 | Selinger | G06F 11/1068 714/768 |
| 2011/0246491 | A1* | 10/2011 | Clash | G06F 3/0685 707/755 |
| 2013/0339582 | A1* | 12/2013 | Olbrich | G06F 3/0679 711/103 |
| 2014/0022854 | A1* | 1/2014 | Balluchi | G06F 3/0604 365/189.05 |
| 2014/0369138 | A1* | 12/2014 | Balluchi | G11C 7/1084 365/189.05 |
| 2015/0067282 | A1* | 3/2015 | Kobayashi | G06F 11/2074 711/158 |
| 2015/0113198 | A1* | 4/2015 | Li | G06F 13/4234 711/2 |
| 2015/0120770 | A1* | 4/2015 | Obukhov | G06F 3/0665 707/758 |
| 2015/0186051 | A1* | 7/2015 | Gurajada | G06F 16/24552 711/113 |
| 2016/0117108 | A1* | 4/2016 | Balluchi | G11C 7/1015 711/154 |
| 2016/0246831 | A1* | 8/2016 | Obukhov | G06F 3/0665 |
| 2017/0109626 | A1* | 4/2017 | Gokmen | G06N 3/084 |
| 2017/0109628 | A1* | 4/2017 | Gokmen | G06N 3/08 |
| 2017/0262029 | A1 | 9/2017 | Nelson et al. | |
| 2018/0004685 | A1* | 1/2018 | Bhatt | G06F 13/4027 |
| 2018/0075338 | A1* | 3/2018 | Gokmen | G06N 3/0454 |
| 2018/0075350 | A1* | 3/2018 | Gokmen | G06N 3/08 |
| 2018/0157437 | A1* | 6/2018 | Sandberg | G06F 12/1027 |
| 2018/0205011 | A1* | 7/2018 | Brew | H01L 45/1641 |
| 2018/0253331 | A1* | 9/2018 | Sato | G06F 3/0659 |
| 2019/0042092 | A1* | 2/2019 | Wu | G06F 3/0673 |
| 2019/0042148 | A1* | 2/2019 | Benisty | G06F 3/061 |
| 2019/0042354 | A1* | 2/2019 | Coquerel | G06F 3/0673 |
| 2019/0073132 | A1* | 3/2019 | Zhou | G06F 3/0688 |
| 2019/0107956 | A1* | 4/2019 | Kachare | G06F 9/4411 |

OTHER PUBLICATIONS

Jim Handy, "IBM Launches Flash DIMMs", Jan. 20, 2014, pp. 1-5, https://thessdguy.com/ibm-launches-flash-dimms/ (Year: 2014).*

Webopedia, "DIMM", Jul. 10, 2011, pp. 1-2, https://web.archive.org/web/20110710154817/https://www.webopedia.com/TERM/D/DIMM.html (Year: 2011).*

Anonymous, "Dual In-line Memory Module (DIMM)", Dec. 12, 2017, pp. 1-3, https://www.techopedia.com/definition/2768/dual-in-line-memory-module-dimm (Year: 2017).*

Eideticom, "Eideticom NoLoad FPGA Accelerator Hardware Eval Kit", Product Brief, Rev. 1.2, Downloaded Apr. 3, 2019, 2 pp.

Intel Corporation, "Intel FPGA Acceleration Hub", [online], [Retrieved on Apr. 3, 2019], Retrieved from the Internet at <URL: https://www.intel.com/content/www/us/en/programmable/solutions/acceleration-hub/solutions.html>, 8 pp.

Intel Corporation, "Intel FPGA Products", [online], [Retrieved on Apr. 3, 2019], Retrieved from the Internet at <URL: https://www.intel.com/content/www/us/en/products/programmable/fpga.html>, 11 pp.

Intel Corporation, "Intel SSD DC Family for PCIe", [online], [Retrieved on Apr. 3, 2019], Retrieved from the Internet at <URL: https://www.intel.com/content/www/us/en/products/docs/memory-storage/solid-state-drives/intel-ssd-dc-family-for-pcie.html>, 7 pp.

Marks, K., "An NVM Express Tutorial", Flash Memory Summit 2013, 92 pp.

NVM Express, "NVM Express Explained", [online], [Retrieved on Mar. 21, 2019], Retrieved from the Internet at <URL: https://nvmexpress.org/wp-content/uploads/2013/04/NVM_whitepaper.pdf>, 5 pp.

Onufryk, P., "How the Streamlined Architecture of NVM Express Enables High Performance PCIe SSDs", Flash Memory Summit 2012, 16 pp.

* cited by examiner

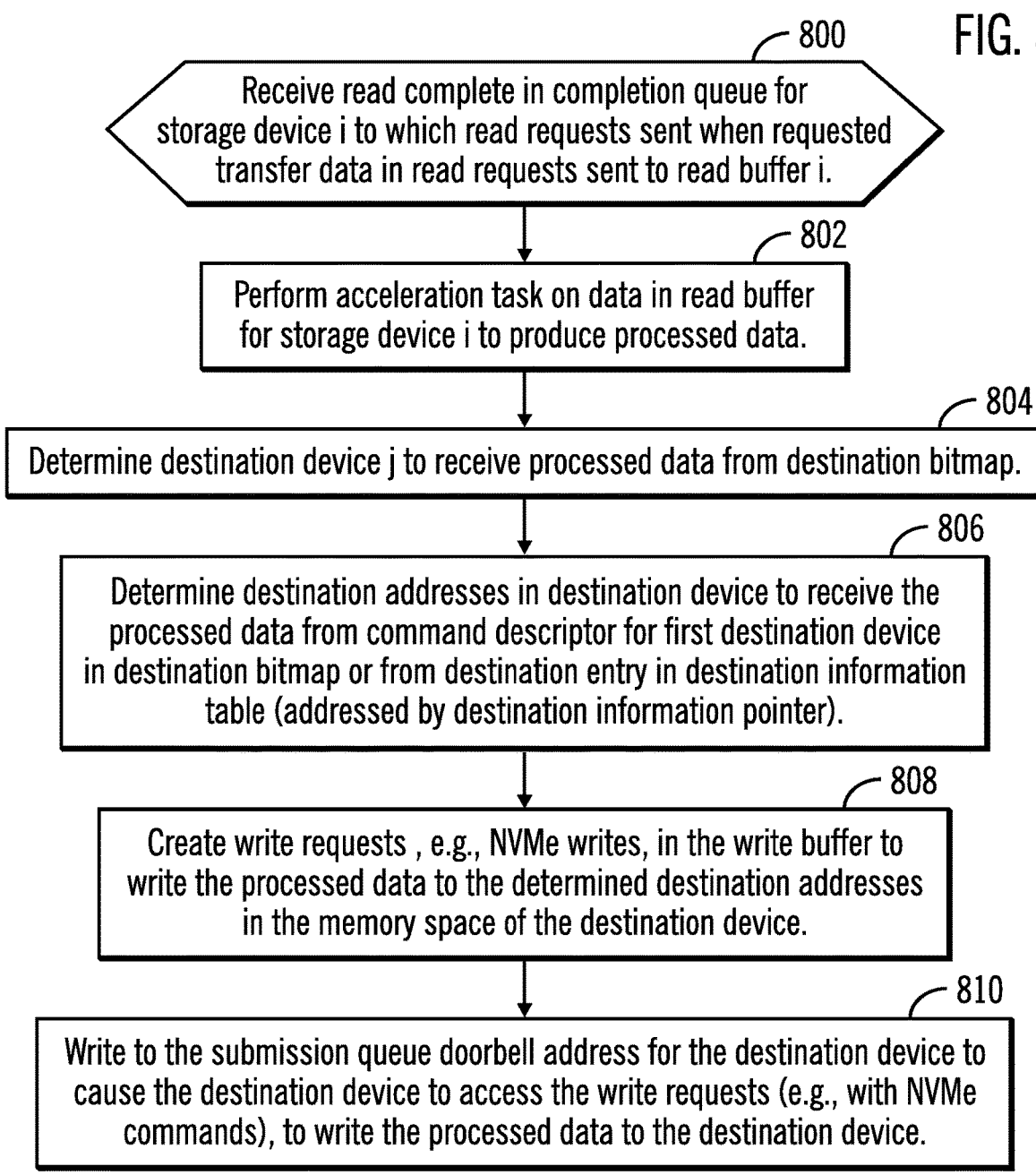
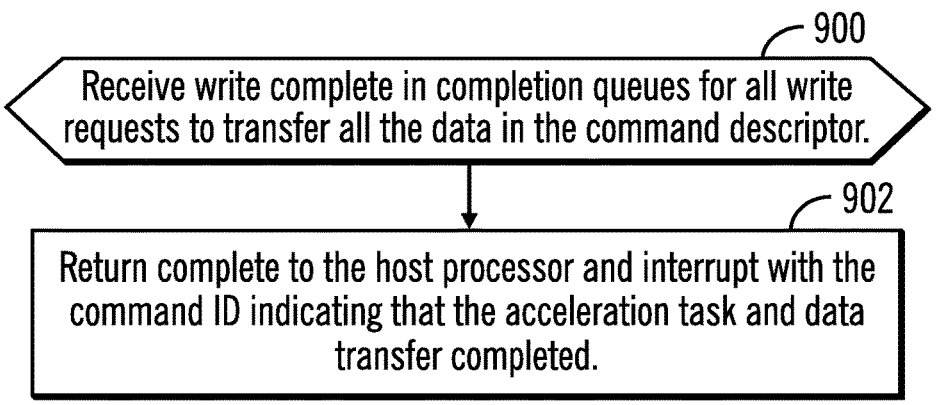

APPARATUS, SYSTEM AND METHOD FOR OFFLOADING DATA TRANSFER OPERATIONS BETWEEN SOURCE AND DESTINATION STORAGE DEVICES TO A HARDWARE ACCELERATOR

TECHNICAL FIELD

Embodiments described herein generally relate to an apparatus, system and method for offloading data transfer operations between source and destination storage devices to a hardware accelerator.

BACKGROUND

Non-Volatile Memory Express (NVMe) is a logical device interface (http://www.nvmexpress.org) for accessing non-volatile storage media attached via a Peripheral Component Interconnect Express (PCIe) bus (http://www.pcsig.com). The non-volatile storage media may comprise a solid-state drive (SSD) or drives using other media. NVMe is designed for accessing low latency storage devices in computer systems, including personal and enterprise computer systems, and is also deployed in data centers requiring scaling to thousands of low latency storage devices.

In an NVMe environment, a host processor will manage access to numerous SSD devices. The host processor controls administration, managing the configuration of submission and completion queues for each detected SSD to direct Input/Output (I/O) requests to and from the attached SSDs. To perform a computation on data being transferred from a source SSD to a destination SSD, the host processor will read the data from the source SSD into the local host memory, then perform a computation locally on the read data or send it to an accelerator device, such as a Field Programmable Gate Array (FPGA), Application Specific Integrated Circuit (ASIC), etc. The accelerator sends the processed data back to the host processor to transfer to the destination SSD.

There is a need in the art for improved technology for transferring data between storage devices and accelerators in a storage environment.

BRIEF DESCRIPTION OF THE DRAWINGS

Embodiments are described by way of example, with reference to the accompanying drawings, which are not drawn to scale.

FIG. 8 illustrates an embodiment of operations performed by a hardware accelerator to write the data read from the one or more source storage devices to one or more destination storage devices.

FIG. 9 illustrates an embodiment of operations performed by a hardware accelerator to return complete to the host processor for the command descriptor.

DESCRIPTION OF EMBODIMENTS

Figure 1:
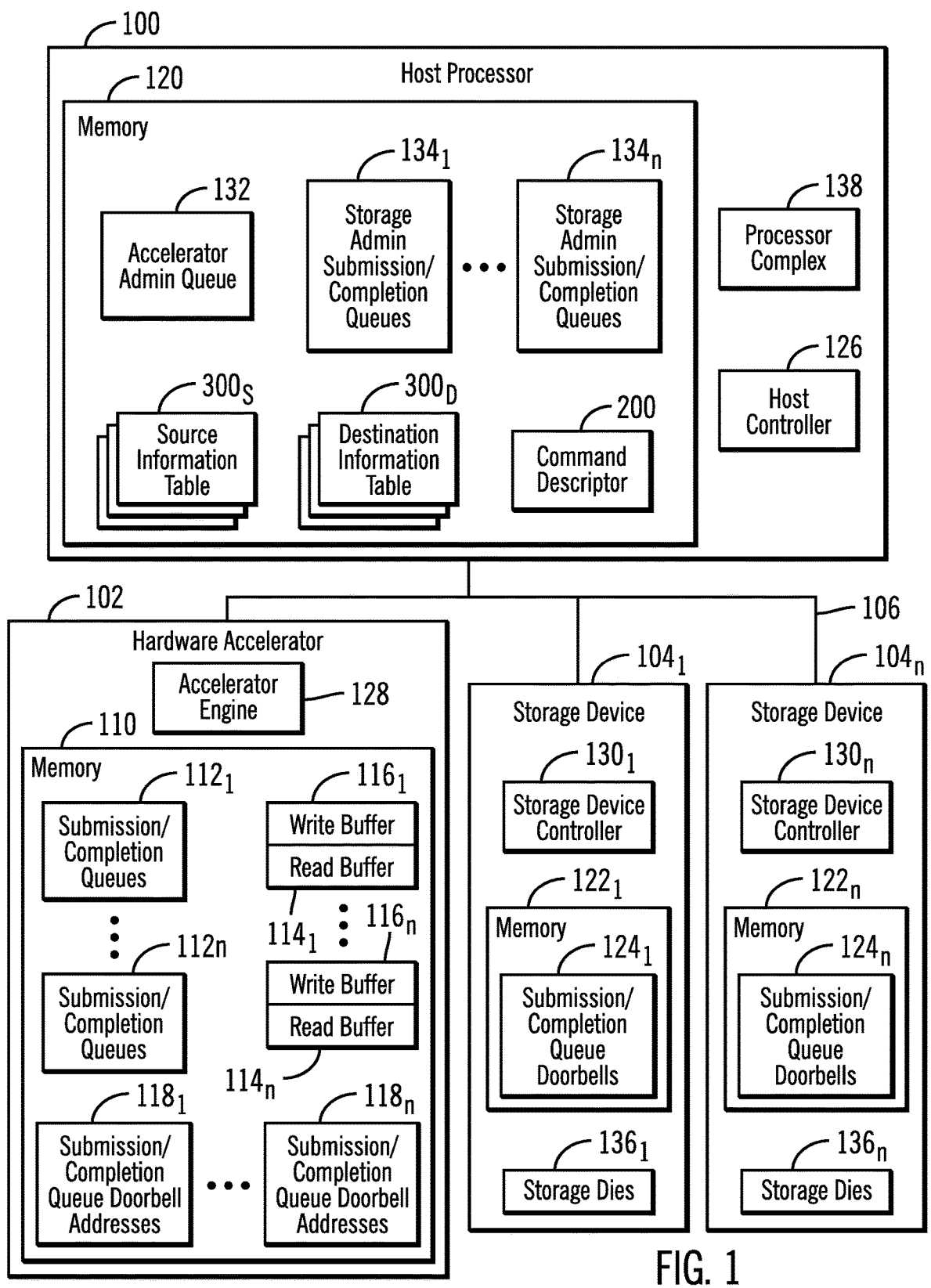
FIG. 1 illustrates an embodiment of a storage environment.

Prior art data transfer operations using a host processor to manage the transfer of data between source and destination storage devices and performing a computation on the data being transferred results in bottlenecks at the host processor. The bottlenecks of the data transfer operations results in latency in host processor operations.

Described embodiments provide improvements to computer technology for transferring data between source and destination storage devices by configuring a hardware accelerator coupled to the host processor and storage devices over a bus interface, such as a PCIe bus, with the logical device interface data structures, such as NVMe submission and completion queues, required for handling the I/O operations. This configuration allows the hardware accelerator to manage and perform the I/O operations while also performing the requested computational operations on the data being transferred. In described embodiments, the host processor sets up the I/O submission and completion queues for all storage devices, such as SSD devices with an NVMe interface, that are connected on a host bus interface, such as a Peripheral Component Interconnect Express (PCIe) switch.

The host processor may configure the hardware accelerator memory space with the submission and completion queues as an extension of the host processor memory, such as Memory Mapped Input/Output (MMIO) space. The host processor offloads data transfer and computation operations by sending a command descriptor to the hardware accelerator specifying a computational task to perform on the data being transferred from one or more source storage devices to one or more destination storage devices. The hardware accelerator uses the logical device interface protocol (e.g., NVMe) and configured submission and completion queues to perform the read and write operations needed to transfer the data and perform computational operations specified in the command descriptor.

The described embodiments reduce host processor latency by offloading the read and write operations for a data transfer to the hardware accelerator that will also be performing the computational tasks on the data being transferred. Further, data throughput is improved by utilizing interfaces between the accelerator and storage devices on the bus (e.g., PCIe bus), and avoiding the front end host processor interface to the bus, which typically receives a substantial amount of the system traffic. Further host processor memory is conserved by using the memory of the hardware accelerator to manage the data transfer operations as well as the computational tasks to perform.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

FIG. 1 illustrates an embodiment of a system having a host processor 100 in communication with a hardware accelerator 102 and a plurality of storage devices $104_1 \ldots 104_n$ over a bus interface 106, such as a Peripheral Component Interconnect Express (PCIe) bus 106, including bus components and a PCIe switch. After enumerating and initializing the storage devices $104_1 \ldots 104_n$, the host processor 100 configures a portion of a memory space 110 of the hardware accelerator 102, such as PCIe Base Address Registers (BAR) of the memory space 110, with submission/completion queues $112_1 \ldots 112_n$, read buffers $114_1 \ldots 114_n$, write buffers $116_1 \ldots 116_n$, and submission/completion queue doorbell addresses $118_1 \ldots 118_n$ for each storage device $104_1 \ldots 104_n$. The submission/completion queues $112_1 \ldots 112_n$, read buffers $114^1 \ldots 114_n$, write buffers $116_1 \ldots 116_n$ in the hardware accelerator memory space 110 may be an extension of a memory space 120 of the host processor 100, such as with a Memory Mapped Input/Output (MMIO) memory space. In this way, the mapped memory space 110 of the hardware accelerator 102 provides an extension of the host processor memory space 120 to offload processing of storage device $104_1 \ldots 104_n$ read and write requests to the hardware accelerator 102. The submission/completion queue doorbell addresses $118_1 \ldots 118_n$ configured in the memory space 110 of the hardware accelerator 102 may point to addresses in memory spaces $122_1 \ldots 122_n$ of the storage devices $104_1 \ldots 104_n$ having the submission/completion queue doorbells $118_1 \ldots 118_n$ according to a memory mapping, such as MMIO.

The host processor 100 memory space 120 may be implemented in one or more volatile memory devices, such as Dual In-line Memory Modules (DIMMs).

The host processor 100, accelerator 102, and storage devices $104_1 \ldots 104_n$ include a host controller 126, accelerator engine 128, and storage device controller $130_1 \ldots 130_n$, respectively, to manage communication on the bus 106 and between the storage devices $104_1 \ldots 104_n$ using a logical device interface protocol, such as the Non-Volatile Memory Express (NVMe) protocol (this specification is available at http://www.nvmexpress.org) or other suitable logical device interface protocols. The submission and completion queues, and queue doorbells may function according to the NVMe protocol specification.

The submission/completion queues $112_i$ and write $116_i$ and read $114_i$ buffers may be used to provide for Direct Memory Access (DMA) transfers of data for read and write requests between the hardware accelerator 102 and the storage devices $104_1 \ldots 104_n$, that bypasses the host processor 100 to offload the management of the read and write for the storage devices $104_1 \ldots 104_n$ to the hardware accelerator 102.

The host controller 126 maintains an accelerator administrative queue 132 to send administrative and configurations commands to the hardware accelerator 102 and storage administrative submission/completion queues $134_1 \ldots 134_n$ to initialize and configure the storage devices $104_1 \ldots 104_n$, respectively, over the bus 106.

The host controller 126 may generate command descriptors 200 to transfer data from one or more source storage devices $104_S$ to one or more destination storage devices $104_D$. The command descriptor 200 may reference a source information table $300_S$ having information on the source storage devices $104_S$ involved in the transfer and a destination information table $300_D$ having information on the destination storage devices $104_D$ to which the data is transferred.

The storage devices $104_1 \ldots 104_n$ further include storage dies $136_1 \ldots 136_n$, such as NAND storage dies for a sold state drive (SSD), in which the data is stored. The SSD may be implemented with different form factors, such as AIC, U.2, M.2, and the "ruler", or Enterprise & Datacenter Storage Form Factor (EDSFF), form factor offered by Intel Corporation for space efficient capacity. In alternative embodiments, the storage devices $104_1 \ldots 104_n$ may implement other storage media, such as magnetic storage or electrically erasable and non-volatile memory cells, such as NAND dies (e.g., single level cell (SLC), multi-level cell (MLC), triple level cell (TLC) NAND memories, etc.), a ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM, SRAM, and other electrically erasable programmable read only memory (EEPROM) type devices.

The memory spaces 120, 110, and $122_1 \ldots 122_n$ may comprise volatile or non-volatile memory storage, such as Static Random Access Memory (SRAM) or other suitable memory device.

The host controller 126, accelerator engine 128, and storage device controllers $130_1 \ldots 130_n$ may be implemented in firmware in the hardware of the devices 100, 102, $104_1 \ldots 104_n$. The firmware may be updated. The host processor 100 may further include a processor complex 138.

The hardware accelerator 102 and control logic of the accelerator engine 128 may be implemented as a Field Programmable Gate Array (FPGA). Application Specific Integrated Circuit (ASIC) or other logic, including programmable logic. Further there may be multiple hardware accelerators 102 to manage data transfer and computational operations with respect to different groups of storage devices $104_i$.

The hardware accelerator memory 110 can also include additional control registers that will be programmed by the host processor 100.

Figure 2:
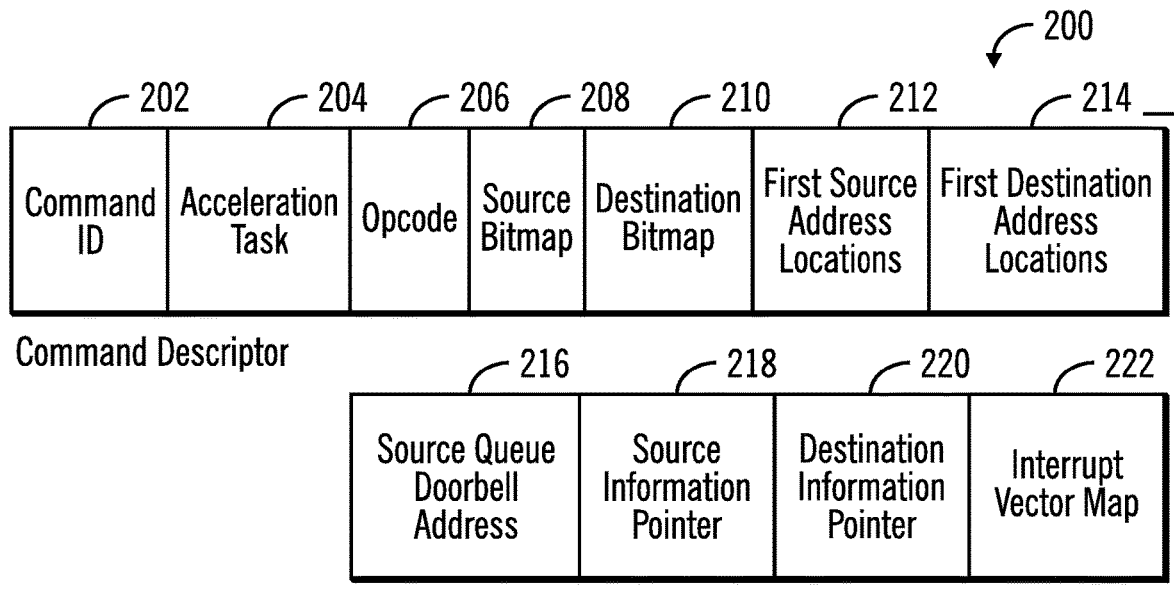
FIG. 2 illustrates an embodiment of a command descriptor to transfer data between source and destination storage devices.

FIG. 2 illustrates an embodiment of the command descriptor 200 the host processor 100 generates to transfer data between the storage devices $104_1 \ldots 104_n$, and includes: a command identifier (ID) 202 of a unique identifier for the command; an acceleration task 204 for the hardware accelerator 102 to perform on data being transferred from the source storage device(s) to destination storage device(s), such as compression, decompression, encryption, decryption, deduplication, error correction, machine/deep learning training and inference, etc.; an operation code (opcode) 206 indicating the type of data transfer to be performed between the source and destination storage devices, including a single source storage device to single destination storage device, a single source storage device to multiple destination storage devices, multiple source destination storage devices to a single destination storage device, and multiple source storage devices to multiple destination storage devices; a source bitmap 208 having a bit for each enumerated storage device $104_1 \ldots 104_n$ indicating the source storage devices from which data is transferred; a destination bitmap 210 having a bit for each enumerated storage device $104_1 \ldots 104_n$ indicating the destination storage devices to which data is transferred; a first source address locations 212 indicating logical block addresses (LBA) or other addresses from which data is transferred in a first or only source storage device $104_{S1}$; a first destination address locations 214 indicating LBA addresses in a first or only destination storage device $104_{D1}$; source doorbell queue address 216 of the first or only source storage device $104_{S1}$ to signal the first source storage device $104_{S1}$ to access read commands from the submission queue $112_i$ to read data to store in the read buffer $114_i$; source information pointer 218 that points to a source information table $300_S$ in the host memory space 120 providing addresses in additional source storage devices, if any, to transfer; a destination information pointer 220 that points to a destination information table $300_D$ in the host memory space 120 providing addresses in additional destination storage devices, if any, to which the transferred data is written; and an interrupt vector, such as Message Signaled Interrupts (MSI-X), defining an interrupt path from the hardware accelerator 102 to the host processor 100 on the bus interface 106, and this field is used to enable or disable the interrupt when a command descriptor is completed by the hardware accelerator 102.

The source and destination addresses involved in the transfer indicated in fields 212, 214 and source $300_S$ and destination $300_D$ information tables may comprise a start LBA and a number of LBAs to transfer.

Figure 3:
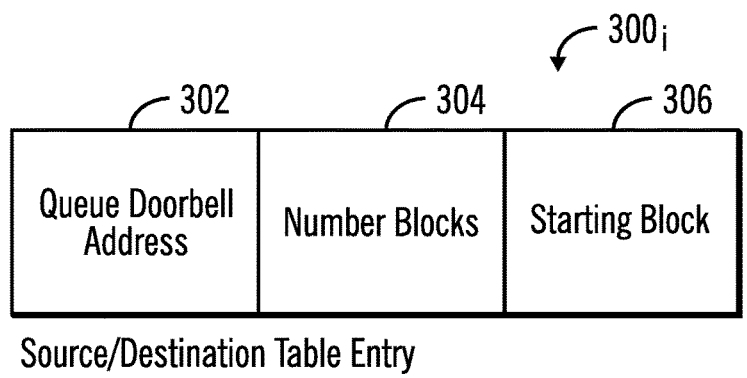
FIG. 3 illustrates an embodiment of a table entry in a source information table and a destination information table having information on one or more source storage devices and destination storage devices involved in a data transfer.

FIG. 3 illustrates an embodiment of a source/destination information table entry $300_i$ in the source $300_S$/destination information table $300_D$, which includes a queue doorbell address 302 to set once commands are available in the submission queue $112_i$ for the source/destination storage device $104_i$; a number of blocks 304, such as LBAs, to transfer; and a starting block 306 in the source/destination storage device $104_i$ of the data to transfer.

In the embodiments of FIGS. 2 and 3, the address locations to transfer for a first or only source and destination storage devices are indicated in the fields 212, 214 and the address locations for additional source and destination storage devices are indicated in the source $300_S$ and destination $300_D$ information tables. In an alternative embodiment, the address locations for all the devices involved in the data transfer, such as the addresses indicated in fields 212 and 214 may be maintained in the entries of the source $300_S$ and destination $300_D$ information tables.

Figure 4:
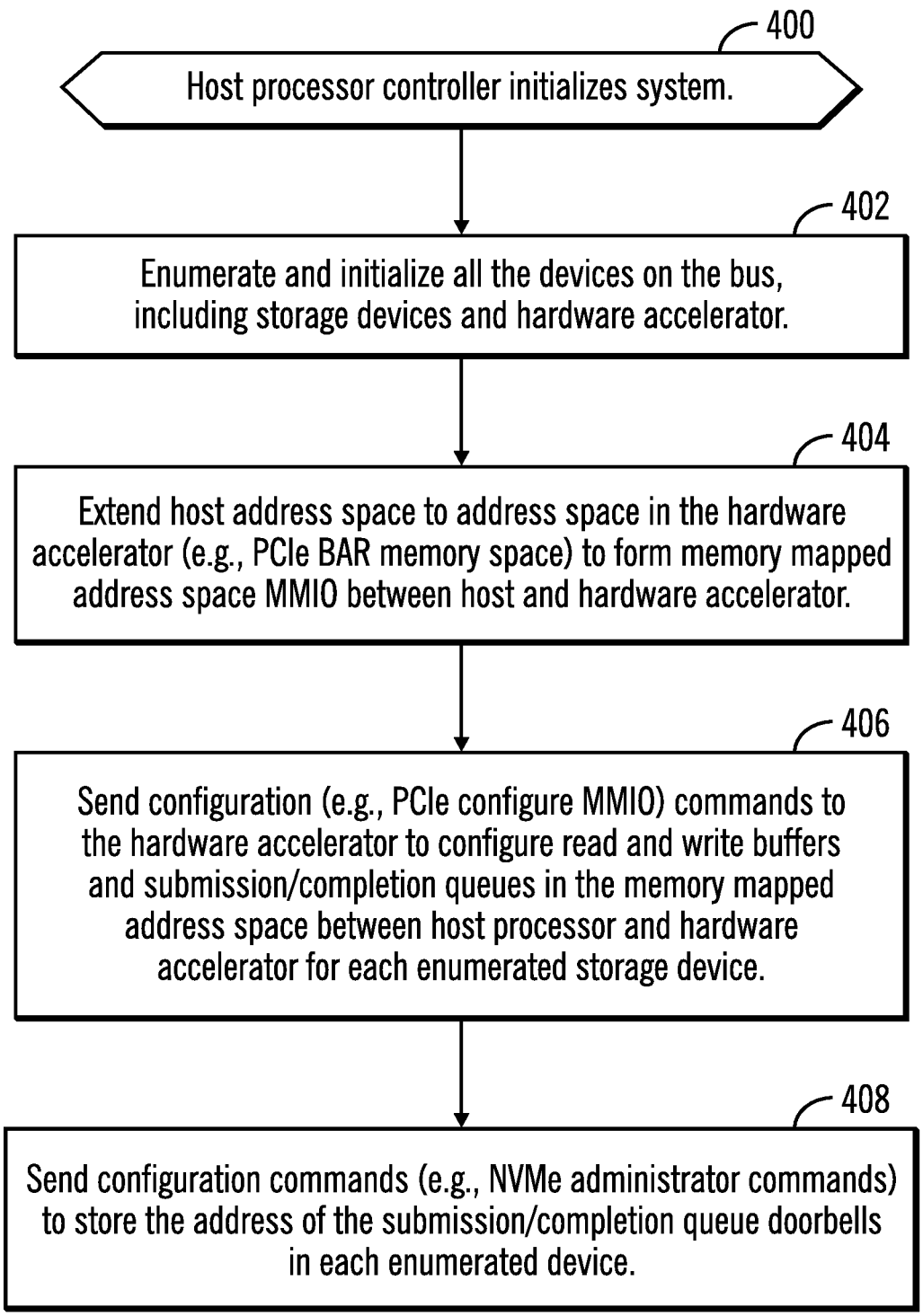
FIG. 4 an embodiment of operations for a host processor to initialize components on a bus.

FIG. 4 illustrates an embodiment of operations performed by the host controller 126 firmware to configure the hardware accelerator 102 and storage devices $104_1 \ldots 104_n$ on the bus 106. Upon initiating (at block 400) system initialization, the host controller 126 enumerates and initializes (at block 402) all the devices on the bus 1-06 including the hardware accelerator 102 and storage devices $104_1 \ldots 104_n$, such as a PCIe enumeration process. The host controller 126 extends (at block 404) host address space in host memory 120 to address space in the memory 110 of the hardware accelerator (e.g., PCIe BAR memory space in the memory 110) to form memory mapped address space MMIO between host 100 and hardware accelerator 102. The host controller 126 sends (at block 406) configuration (e.g., PCIe configure MMIO) commands to the hardware accelerator 102 to configure read $114_1 \ldots 114_n$ and write $116_1 \ldots 116_n$ buffers and submission/completion queues $112_1 \ldots 112_n$ in the memory mapped address space between host memory 120 and hardware accelerator memory 110 for each enumerated storage device $104_1 \ldots 104_n$. The host controller 126 further sends (at block 408) configuration commands, e.g., NVMe administrator commands, to store addresses in the hardware accelerator memory space 120 which correspond to addresses in storage device memory space $122_1 \ldots 122_n$ of submission/completion queue doorbells $118_1 \ldots 118_n$ in each enumerated storage device $104_1 \ldots 104_n$. The host controller 126 may send configuration commands to the hardware accelerator 102 via the accelerator administrator queue 132, which the hardware accelerator 102 accesses over the bus 106 when signaled via a submission queue doorbell (not shown).

With the embodiment of FIG. 4, the host controller 126 configures the logical device interface protocol (e.g., NVMe) submission/completion queues and doorbells needed in the hardware accelerator memory 110 to offload the management of read and write operations to the storage devices $104_1 \ldots 104_n$, data transfer operations, and accelerator task execution operations to the hardware accelerator 102 to improve performance at the host processor 100.

Figure 5:
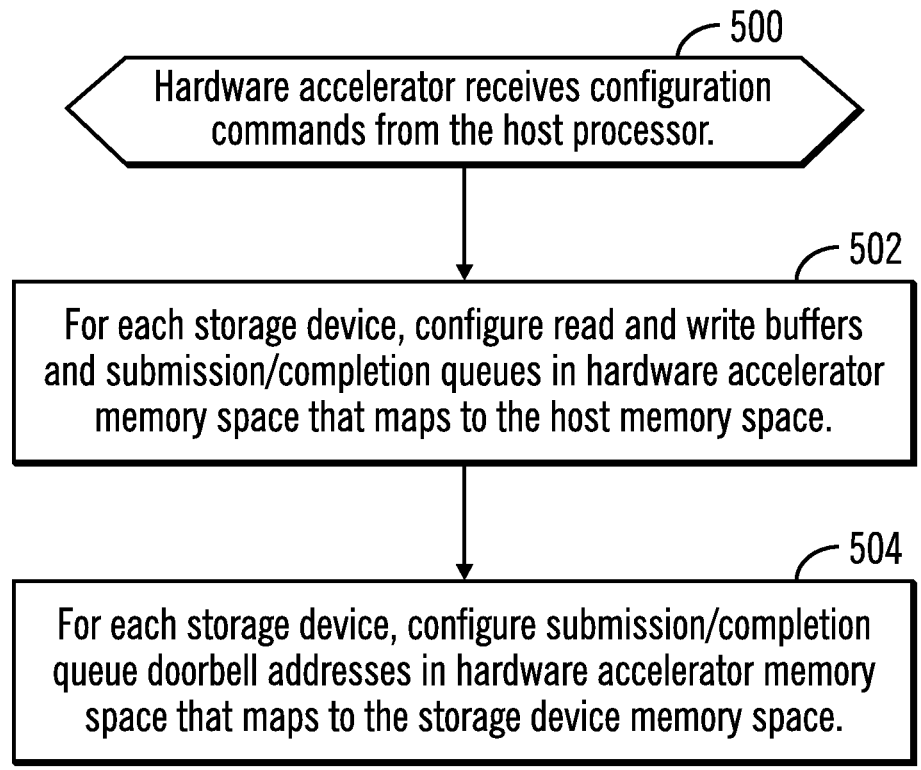
FIGS. 5 and 6 illustrate embodiments of operations for a hardware accelerator to process configuration commands from a host processor.

FIG. 5 illustrates an embodiment of operations performed by the accelerator engine 128, which includes hardware and/or firmware implementing PCIe bus protocols and the logical device interface protocol, such as the NVMe protocol, to process the configuration commands from the host processor 100. Upon receiving (at block 500) the configuration commands, the accelerator engine 128 configures, for each enumerated storage device $104_1 \ldots 104_n$, in the hardware accelerator memory space 110 that maps to the host memory space 120, the read $114_1 \ldots 114_n$ and write $116_1 \ldots 116_n$ buffers and submission/completion queues $112_1 \ldots 112_n$. The submission/completion queue doorbell addresses $118_1 \ldots 118_n$ are configured (at block 504) in the hardware accelerator memory space 110 that maps to the storage device memory space $122_1 \ldots 122_n$ for each enumerated storage device $104_1 \ldots 104_n$.

With the embodiment of FIG. 5, the host processor 100 commands the hardware accelerator 102 to configure the queues and buffers needed to communicate with the storage devices $104_1 \ldots 104_n$ in the hardware accelerator memory space 110 that maps to the host memory space 120 to allow the host processor 100 to offload the management of read and write operations to the storage devices $104_1 \ldots 104_n$ to the hardware accelerator 102. The host processor 100 initializes all the storage devices enumerated on the bus 106 by issuing NVMe administrator commands and configures the hardware accelerator 102 by initializing a PCIe Bar register space in the accelerator memory 110. After these initialization operations, the hardware accelerator 102 is ready to process command descriptors 200 from the host processor 100.

Figure 6:
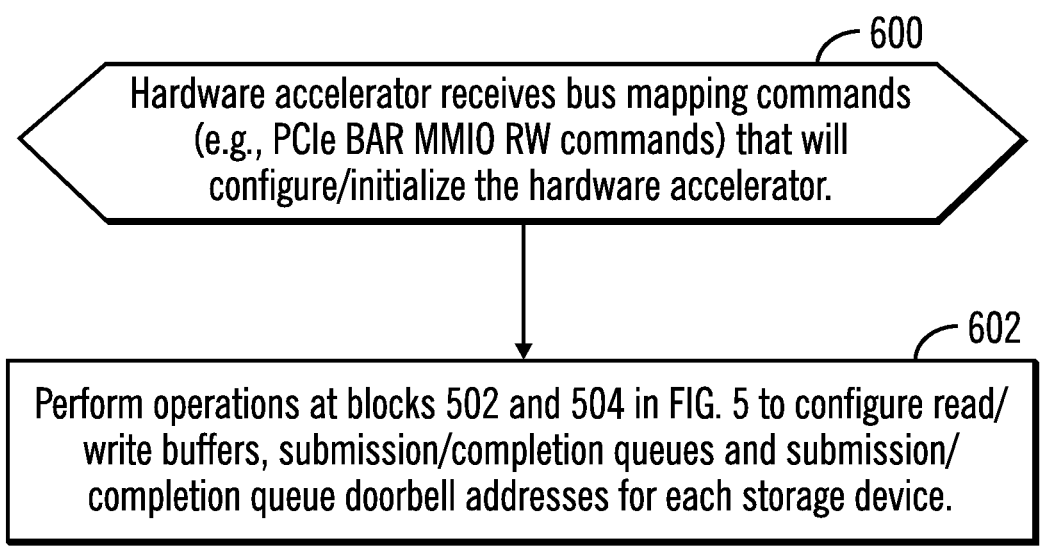

FIG. 6 illustrates an alternative embodiment of operations implemented in the accelerator engine 128, implementing bus (PCIe) and storage (NVMe) protocols to control the configuration of the hardware accelerator 102 that involves the hardware accelerator performing the configurations. Upon the hardware accelerator 102 receiving (at block 600) from the host processor 100 bus mapping commands, such as PCIe BAR MMIO read/write (RW) commands, the accelerator engine 128 performs (at block 602) the operations at blocks 502 and 504 in FIG. 5 to configure read 114/write $116_i$ buffers, submission/completion queues $112_i$ and submission/completion queue doorbell addresses $118_i$ for each storage device $104_i$.

With the embodiment of FIG. 6, the host processor 100 carries out the administrative commands and storage device enumeration. The hardware accelerator 102 acts as an NVMe initiator after the enumeration/initialization is complete, during which the accelerator 102 can initiate NVMe read/write transactions with the storage devices $104_i$.

With the operations of FIGS. 5 and 6, the host processor 100 configures the hardware accelerator 102 with all the required NVMe related queues and performs the NVMe initialization of the available storage devices $104_i$ so there is no splitting of the control plane and data plane between the host processor 100 and the hardware accelerator 102. The control and data planes of the storage devices $104_i$ reside in the hardware accelerator 102, thus making the hardware accelerator 102 a complete NVMe initiator for the storage devices $104_1 \ldots 104_n$. NVMe read and write operations are handled by the hardware accelerator 102.

Figure 7:
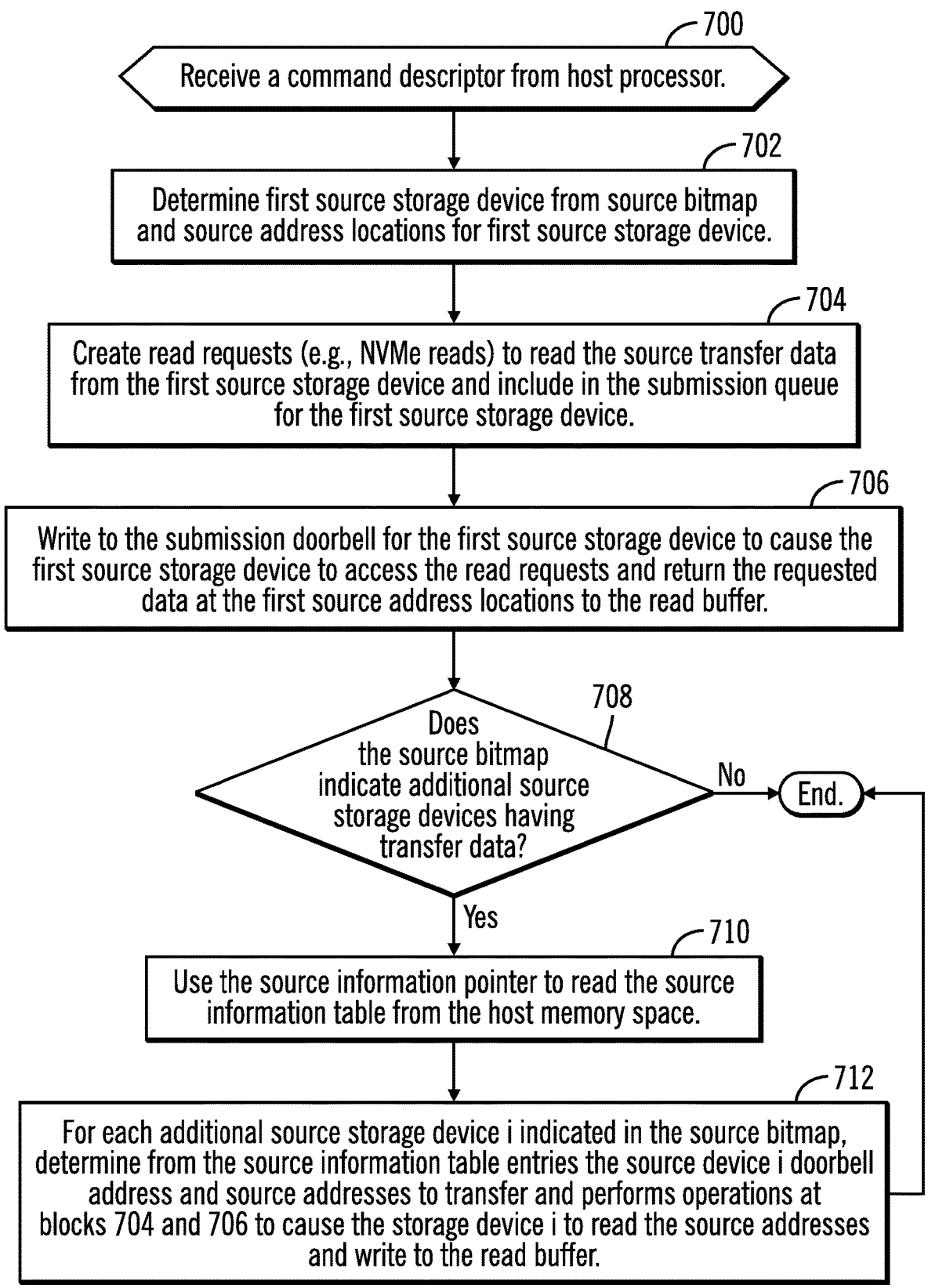
FIG. 7 an embodiment of operations for a hardware accelerator to process a command descriptor from a host processor to read data from one or more source storage devices to transfer to one or more destination storage devices.

FIG. 7 illustrates an embodiment of operations performed by the accelerator engine 128 in the hardware accelerator 102 to process a command descriptor 200 from the host processor 100 to effectuate a transfer of data from at least one storage device to at least one destination storage device. Upon receiving (at block 700) a command descriptor 200, the accelerator engine 128 determines (at block 702) a first source storage device $104_{S1}$ from source bitmap 208 and first source address locations 212 for the first source storage device $104_{S1}$. The accelerator engine 128 creates (at block 704) read requests, e.g., NVMe reads, to read the source transfer data from the first source storage device $104_{S1}$ and includes the read requests in the submission queue $112_{S1}$ for the first source storage device $104_{S1}$. The accelerator engine 128 writes (at block 706) to the submission queue doorbell address $118_{S1}$ for the first source storage device $104_{S1}$ to cause the first source storage device $104_{S1}$ to access the read requests in the submission queue $112_{S1}$ and return the requested data at the first source address locations 212 to the read buffer $114_{S1}$ for the first source storage device $104_{S1}$. If (at block 708) the source bitmap 208 indicates there are additional source storage devices having transfer data, then the accelerator engine 128 uses (at block 710) the source information pointer 218 to access the source information table $300_S$ from the host memory 120.

For each additional source storage device $104_i$ indicated in the source bitmap 208, the accelerator engine 128 determines (at block 712) from the source information table entries $300_i$ the source storage device $104_i$ doorbell queue address $118_i$ and source addresses to transfer 304, 306 and performs the operations at blocks 704 and 706 to cause the storage device $104_i$ to read the source addresses 304, 306 in the additional storage device $104_i$ and write to the read buffer $114_i$ for the additional storage device $104_i$. Control ends after generating the writes for multiple of source storage devices (from block 712) or if the source bitmap 208 does not indicate additional storage devices $104_i$ (from no branch of block 708).

FIG. 8 illustrates an embodiment of operations performed by the accelerator engine 128 in the hardware accelerator 102 to process a read complete in a completion queue $112_i$ for storage device $104_i$ to which read requests were sent. Upon receiving read completion in a completion queue $112_i$, the accelerator engine 128 performs the acceleration task 204 indicated in the command descriptor 200 on the data transferred to the read buffer $114_i$ to produce processed data. The accelerator engine 128 determines (at block 804) a destination storage device $104_j$ to receive the processed data and determines the destination address locations in the determined destination storage device $104_D$ to receive the processed data from the command descriptor 214 for the first destination storage device in destination bitmap 210 or from the destination entry $300_j$ in destination information table $300_D$ (addressed by destination information pointer 220) for additional destination storage devices $104_D$. The determination of the destination storage device $104_j$ and destination address location may involve determining the destination table entry $300_j$ in the destination information table $300_D$ corresponding to the source table entry $300_i$ used to read the data, and then determining from fields 302 and 306 the destination storage device $104_j$ and starting destination address 306. In one embodiment, each entry in the source information table $300_S$ may have a corresponding entry in the destination information table $300_D$. If one source storage device has data to transfer to multiple destination devices, then there may be multiple entries $300_i$ in the source information table $300_S$ for one source storage device indicating the different starting blocks 306 having source data for different destination storage devices for which there are multiple entries in the destination information table $300_D$. Likewise, if one destination storage device receives data transferred from multiple source devices, then there may be multiple entries in the destination information table $300_S$ for one destination device indicating the different starting blocks 306 to receive the data from the different source devices for which there are multiple entries in the source information table $300_S$.

The accelerator engine 128 creates (at block 808) write requests, e.g., NVMe write requests, in the write buffer $116_j$ for the determined destination storage device $104_j$ to write the processed data to the determined destination addresses in the memory space $122_j$ of the destination storage device $104_j$. The accelerator engine 128 writes (at block 810) to the submission queue doorbell address $118_j$ for the destination storage device $104_j$ to cause the destination storage device $104_j$ to access the write requests, such as with NVMe commands, in the write buffer $116_j$ to write the processed data to the destination storage device $104_j$.

With the embodiment of FIGS. 7 and 8, the hardware accelerator 102 handles the transfer of data between source and destination storage devices and the performing of an acceleration task on the data being transferred to offload the management of the data transfer and processing operations from the host processor 100 to a dedicated hardware accelerator 102 to relieve processing burdens on the host processor 100. Further, described embodiments provide for DMA transfers over the bus 106 between the hardware accelerator 102 and the storage devices $104_1 \ldots 104_n$ to improve the transfer speed.

FIG. 9 illustrates an embodiment of operations performed by the accelerator engine 128 to return complete to the host processor 100 upon completing a transfer operation. Upon the accelerator engine 128 receiving write complete in all the completion queues $112_i$ for all write requests to transfer all the data in the command descriptor 200, complete is returned with an interrupt, indicated in the interrupt vector map 222, (at block 902) to the host processor 100 with the command ID 202 indicating that the acceleration task and data transfer between specified source and destination storage devices completed.

Figure 10:
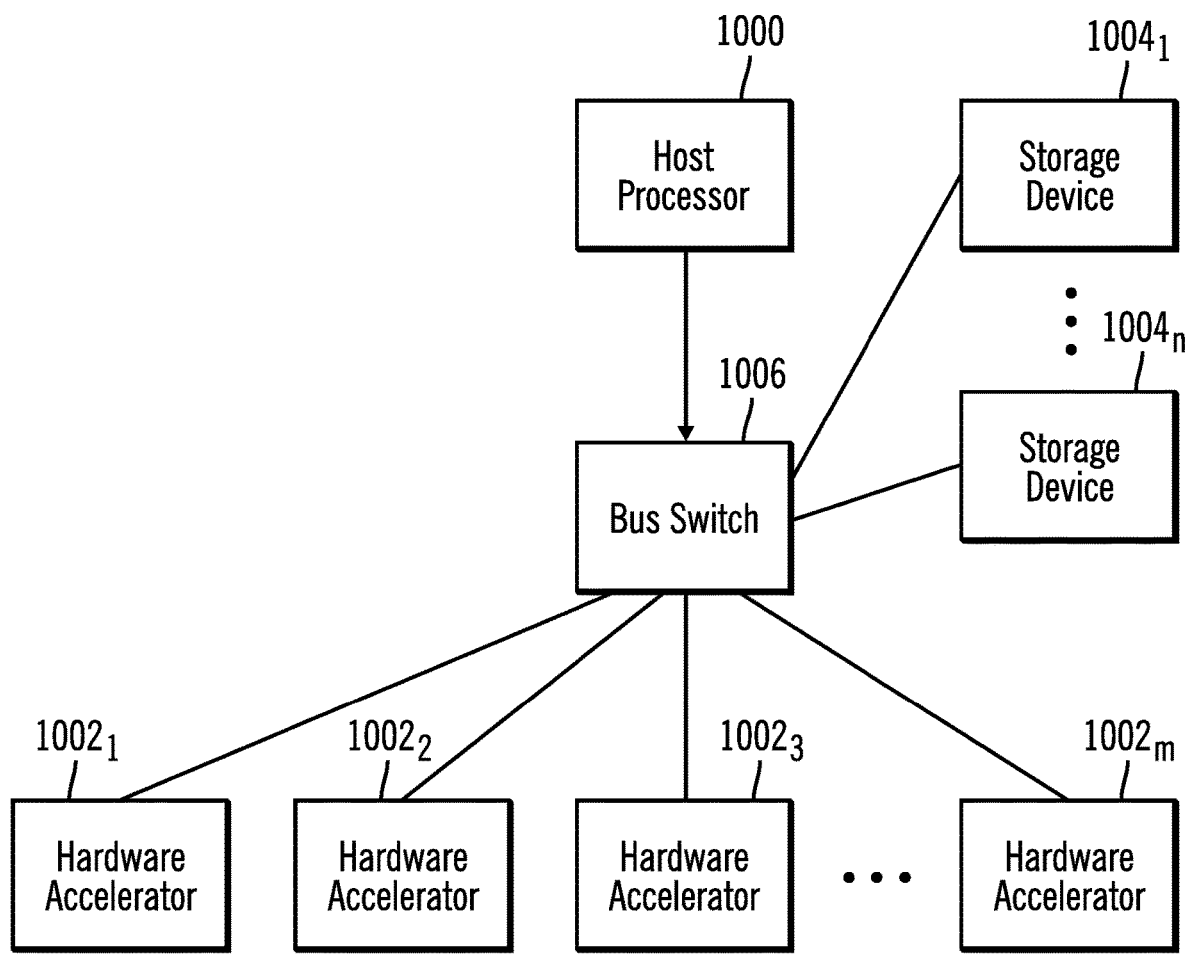
FIG. 10 illustrates an embodiment of a system in which the storage environment of FIG. 1 may be deployed.

FIG. 10 illustrates an additional embodiment where the hardware accelerator 102 is deployed as a systolic array of a multiplicity of hardware accelerators $1002_1$, $1002_2$, $1002_3 \ldots 1002_m$ and a multiplicity of storage devices $1004_1$, $1004_2$, $1004_3 \ldots 1004_n$ that are programmed by a host processor 1000, such as host processor 100, connected over a bus switch 1006, such as a PCIe switch, to operate in unison as a collective serial and/or parallel data flow engine.

In a systolic array a collection of accelerators may appear to the host processor 1000 as a single logical subsystem (thus the term systolic) with more performance or able to handle more complex offloads than the independent accelerators could achieve independently. This is achieved by partitioning the problem across the array elements in a manner that exploits parallel acceleration (for performance), serial processing (to enable more functionality), or a hybrid combination of parallel and serial operations, specific to the needs of the target workload.

For example, in a chassis with 16 to 32 slots, there may, by way of example, multiple hardware accelerators $1002_i$ programmed as a single systolic array to manage operations for a plurality of storage devices $104_j$ that are storing different types of time stamped sensor data from an autopilot development car (where you drive around with humans and simply record all the sensor data from video cameras, infrared cameras, lidar, sonar, etc. to capture a data set you can then analyze back in the lab). These multiple hardware accelerators in a systolic array work in parallel, each doing similar but different operations and computations with their respective data, and then pass their results on to a separate hardware accelerator in the same systolic array that is programmed to consolidate the input in some manner. The hardware accelerator $1002_j$ performing the consolidation of input operation may write out the data to another storage device $104_i$ as a result file.

For a systolic array, one of the hardware accelerators $1002_i$ in the systolic array receives a command descriptor 200 and may perform part of the processing required by the command descriptor 200 and forward to one or more additional hardware accelerators in the group to perform additional processing for the command descriptor 200, so that multiple of the hardware accelerators in the systolic array are involved in processing in parallel or serial operations required by the command descriptor 200.

Figure 11:
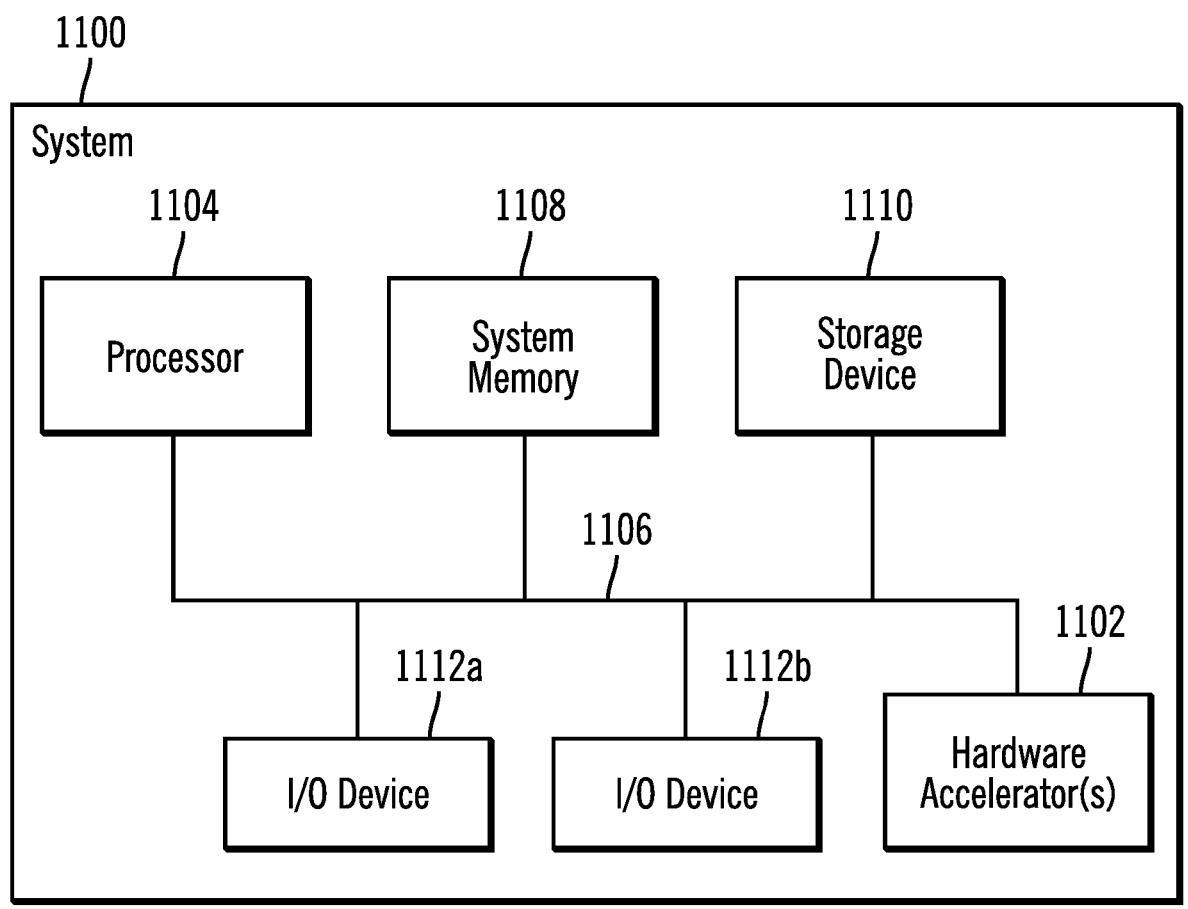
FIG. 11 illustrates an embodiment of a system in which the components of FIGS. 1 and 10 may be deployed.

FIG. 11 illustrates an embodiment of a system 1100 in which the components of FIGS. 1 and 10 may be deployed. The system 1100 includes a processor 1104, comprising host processor 100, that communicates over a bus 1106, such as bus 106, with a system memory device 1108 in which programs, operands and parameters being executed are cached, and storage devices 1110, which may comprise the storage devices $104_1 \ldots 104_n$, such as solid state drive (SSD), that store programs and user data that may be loaded into the system memory 1108 for execution. The processor 1104 may offload operations, such as NVMe operations, to one or more hardware accelerators 1102, such as hardware accelerator 102 or systolic arrays of hardware accelerators $1002_1 \ldots 1002_m$. The processor 1104 may also communicate with Input/Output (I/O) devices $1112_a$, $1112_b$, which may comprise input devices (e.g., keyboard, touchscreen, mouse, etc.), display devices, graphics cards, ports, network interfaces, etc. The memory 1108 and storage device 1110 may be coupled to an interface on the system 1100 motherboard, mounted on the system 1100 motherboard, or deployed in an external memory device or accessible over a network.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

The reference characters used herein, such as i, are used to denote a variable number of instances of an element, which may represent the same or different values, and may represent the same or different value when used with different or the same elements in different described instances.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

EXAMPLES

The following examples pertain to further embodiments.

Example 1 is an apparatus connected to a host processor and a plurality of storage devices including a memory space including read buffers and write buffers for the storage devices and control logic. The control logic receives, from the host processor, a command descriptor indicating at least one source storage device having transfer data to transfer to at least one destination storage device and a computational task to perform on the transfer data. The control logic sends read commands to the at least one source storage device to read the transfer data to at least one read buffer in the memory space and performs the computational task on the transfer data in the at least one read buffer to produce modified transfer data. The control logic writes the modified transfer data to at least one write buffer in the memory space to cause the modified transfer data to be written to the at least one destination storage device.

In Example 2, the subject matter of Examples 1 and 3-10 can optionally include that the command descriptor includes a pointer to information on addresses of the transfer data in the at least one of the source and destination storage devices in a host memory space of the host processor.

In Example 3, the subject matter of Examples 1, 2, and 4-10 can optionally include that the command descriptor includes a source pointer to source information in a host memory space of the host processor indicating the transfer data in a plurality of source storage devices and a destination pointer to destination information in the host memory space having locations in a plurality of destination storage devices to which the transfer data is transferred.

In Example 4, the subject matter of Examples 1-3 and 5-10 can optionally include that the source information includes a plurality of source entries for a plurality of source storage devices. Each source entry indicates an address range of a source storage device of the plurality of source storage devices having a portion of the transfer data. The destination information includes a plurality of destination entries for a plurality of destination storage devices, corresponding to the source entries. Each destination entry indicates destination addresses in a destination storage device of the plurality of destination storage devices to which the portion of the transfer data indicated in a corresponding source entry is transferred.

In Example 5, the subject matter of Examples 1-4 and 6-10 can optionally include that each of the source entries further includes a source queue doorbell address in one of the source storage devices and each of the destination entries includes a destination queue doorbell address in one of the destination storage devices. The control logic is further to write to a source queue doorbell address indicated in a selected source entry of the source information to cause the source storage device having the source queue doorbell address to transfer a portion of the transfer data indicated in the address range of the selected source entry. The control logic writes to a destination queue doorbell address indicated in a selected destination entry of the destination information to cause a destination storage device having the destination queue doorbell address to write the portion of the transfer data to the address range of the destination storage device indicated in the selected destination entry.

In Example 6, the subject matter of Examples 1-5 and 7-10 can optionally include that the control logic is further to receive configuration commands from the host processor to extend the memory space of the host processor. The read and the write buffers are configured in the mapped addresses in the memory space, and wherein the mapped addresses in the memory space extend a host memory space.

In Example 7, the subject matter of Examples 1-6 and 8-10 can optionally include that the control logic is further to receive, from the host processor, configuration commands to cause the control logic to configure read and write buffers in the memory space and configure submission queues in the memory space, wherein the control logic adds the read commands to the submission queues to cause source storage devices to transfer data to the read buffers and adds write commands to submission queues for the transfer data in the write buffers to cause destination storage devices to write the transfer data in the write buffers to the destination storage devices.

In Example 8, the subject matter of Examples 1-7 and 9-10 can optionally include that the configuration commands are further to cause the control logic to configure queue doorbell addresses in the memory space that point to addresses in the storage devices. Writing to one of the queue doorbell addresses for one of the storage devices causes that storage device to access a read or write request included in a submission queue for the storage device.

In Example 9, the subject matter of Examples 1-8 and 10 can optionally include that the control logic is further to receive, from the host processor, mapped memory addresses in the storage devices. In response to receiving the mapped memory addresses, the control logic is to configure the read and the write buffers in the memory space and configure submission and completion queues for the storage devices in the mapped memory addresses in the storage devices. The control logic adds the read commands to at least one submission queue for the at least one source storage device to read the transfer data and adds write commands to at least one submission queue for the at least one destination storage device to transfer the modified transfer data in at least one write buffer to the at least one destination storage device in response to complete returned in at least one of the completion queues to the read commands added to the at least one submission queue.

In Example 10, the subject matter of Examples 1-9 can optionally include programmable hardware logic coupled to a bus interface further coupled to the host processor and the storage devices.

Example 11 is a system connected to a host processor and a plurality of storage devices, comprising a plurality of hardware accelerators configured to operate as a single systolic array to manage read and write operations with respect to a group of the storage devices. The hardware accelerators operate in parallel or serial with respect to the group of the storage devices. Each of the hardware accelerators configured in the single systolic array comprise a memory space including read buffers and write buffers for the storage devices and control logic. The control logic receives, from the host processor, a command descriptor indicating at least one source storage device of the group of the storage devices having transfer data to transfer to at least one destination storage device of the group of the storage devices and a computational task to perform on the transfer data. The control logic sends read commands to the at least one source storage device to read the transfer data to at least one read buffer in the memory space and performs the computational task on the transfer data in the at least one read buffer to produce modified transfer data. The control logic writes the modified transfer data to at least one write buffer in the memory space to cause the modified transfer data to be written to the at least one destination storage device.

In Example 12, the subject matter of Example 11 can optionally include that one of the hardware accelerators in the single systolic array receives the command descriptor and forward processing results to at least one other hardware accelerator in the single systolic array to perform processing operations to complete the command descriptor.

Example 13 is a system in communication with a host processor, comprising Dual In-line Memory Modules (DIMMs) implementing a memory space of the host processor, a plurality of storage devices, and a hardware device. The hardware device comprises a memory space including read buffers and write buffers for the storage devices providing an extension of the memory space of the host processor and control logic. The control logic receives, from the host processor, a command descriptor indicating at least one source storage device having transfer data to transfer to at least one destination storage device and a computational task to perform on the transfer data. The control logic sends read commands to the at least one source storage device to read the transfer data to at least one read buffer in the memory space and performs the computational task on the transfer data in the at least one read buffer to produce modified transfer data. The control logic writes the modified transfer data to at least one write buffer in the memory space to cause the modified transfer data to be written to the at least one destination storage device.

In Example 14, the subject matter of Examples 13 and 15-19 can optionally include that the command descriptor includes a pointer to information on addresses of the transfer data in the at least one of the source and destination storage devices in a host memory space of the host processor.

In Example 15, the subject matter of Examples 13, 14 and 16-19 can optionally include that the command descriptor includes a source pointer to source information in a host memory space of the host processor indicating the transfer data in a plurality of source storage devices and a destination pointer to destination information in the host memory space having locations in a plurality of destination storage devices to which the transfer data is transferred.

In Example 16, the subject matter of Examples 13-15 and 17-19 can optionally include that the source information includes a plurality of source entries for a plurality of source storage devices. Each source entry indicates an address range of a source storage device of the plurality of source storage devices having a portion of the transfer data. The destination information includes a plurality of destination entries for a plurality of destination storage devices, corresponding to the source entries. Each destination entry indicates destination addresses in a destination storage device of the plurality of destination storage devices to which the portion of the transfer data indicated in a corresponding source entry is transferred.

In Example 17, the subject matter of Examples 13-16 and 18-19 can optionally include that each of the source entries further includes a source queue doorbell address in one of the source storage devices and each of the destination entries includes a destination queue doorbell address in one of the destination storage devices. The control logic writes to a source queue doorbell address indicated in a selected source entry of the source information to cause the source storage device having the source queue doorbell address to transfer a portion of the transfer data indicated in the address range of the selected source entry. The control logic writes to a destination queue doorbell address indicated in a selected destination entry of the destination information to cause a destination storage device having the destination queue doorbell address to write the portion of the transfer data to the address range of the destination storage device indicated in the selected destination entry.

In Example 18, the subject matter of Examples 13-17 and 19 can optionally include that the control logic is further to receive configuration commands from the host processor to extend the memory space of the host processor. The read and the write buffers are configured in the mapped addresses in the memory space, and wherein the mapped addresses in the memory space extend a host memory space.

In Example 19, the subject matter of Examples 13-18 can optionally include that the control logic is further to receive, from the host processor, configuration commands to cause the control logic to configure read and write buffers in a memory space and configure submission queues in the memory space. The control logic adds the read commands to the submission queues to cause source storage devices to transfer data to the read buffers and adds write commands to submission queues for the transfer data in the write buffers to cause destination storage devices to write the transfer data in the write buffers to the destination storage devices.

Example 20 is a method for transferring data among storage devices. A command descriptor is received from a host processor indicating at least one source storage device having transfer data to transfer to at least one destination storage device and a computational task to perform on the transfer data. Read commands are sent to the at least one source storage device to read the transfer data to at least one read buffer in a memory space including read buffers and write buffers for the storage devices. The computational task is performed on the transfer data in the at least one read buffer to produce modified transfer data. The modified transfer data is written to at least one write buffer in the memory space to cause the modified transfer data to be written to the at least one destination storage device.

In Example 21, the subject matter of Examples 20 and 22-25 can optionally include that the command descriptor includes a pointer to information on addresses of the transfer data in the at least one of the source and destination storage devices in a host memory space of the host processor.

In Example 22, the subject matter of Examples 20, 21 and 23-25 can optionally include that the command descriptor includes a source pointer to source information in a host memory space of the host processor indicating the transfer data in a plurality of source storage devices and a destination pointer to destination information in the host memory space having locations in a plurality of destination storage devices to which the transfer data is transferred.

In Example 23, the subject matter of Examples 20-22 and 24-25 can optionally include that the source information includes a plurality of source entries for a plurality of source storage devices. Each source entry indicates an address range of a source storage device of the plurality of source storage devices having a portion of the transfer data. The destination information includes a plurality of destination entries for a plurality of destination storage devices, corresponding to the source entries, wherein each destination entry indicates destination addresses in a destination storage device of the plurality of destination storage devices to which the portion of the modified transfer data indicated in a corresponding source entry is transferred.

In Example 24, the subject matter of Examples 20-23 and 25 can optionally include receiving configuration commands from the host processor to extend the memory space of the host processor. The read and the write buffers are configured in the mapped addresses in the memory space, and wherein the mapped addresses in the memory space extend a host memory space.

In Example 25, the subject matter of Examples 20-24 can optionally include receiving, from the host processor, configuration commands to cause operations comprising configuring read and write buffers in a memory space and configuring submission queues in the memory space. The read commands are added to the submission queues to cause source storage devices to transfer data to the read buffers and adds write commands to submission queues for the transfer data in the write buffers to cause destination storage devices to write the transfer data in the write buffers to the destination storage devices.

Example 26 is an apparatus comprising means to perform a method as claimed in any preceding claim.

Example 27 is a machine-readable storage including machine-readable instructions, when executed, to implement a method or realize an apparatus as claimed in any preceding claim.

What is claimed:

1. An apparatus comprising a hardware accelerator connected to a host processor and a plurality of storage devices having storage device controllers, wherein the hardware accelerator comprises:
   a memory space including read buffers and write buffers for the storage devices, wherein the hardware accelerator is implemented in hardware separate from the storage devices and the storage device controllers of the storage devices; and
   control logic to:
   receive, from the host processor, a command descriptor indicating a source storage device having transfer data to transfer to a destination storage device, an operation code indicating a type of data transfer to be performed between the source storage device and the destination storage device, and a computational task to perform on the transfer data;

send read commands to the source storage device to read the transfer data to at least one read buffer in the memory space;

perform the computational task on the transfer data in the at least one read buffer to process the transfer data and transform to produce modified transfer data; and write the modified transfer data to at least one write buffer in the memory space to cause the modified transfer data to be written to the destination storage device.

2. The apparatus of claim 1, wherein the command descriptor includes a pointer to information on addresses of the transfer data in the at least one of the source and destination storage devices in a host memory space of the host processor.

3. The apparatus of claim 1, wherein the command descriptor includes a source pointer to source information in a host memory space of the host processor indicating the transfer data in a plurality of source storage devices and a destination pointer to destination information in the host memory space having locations in a plurality of destination storage devices to which the transfer data is transferred.

4. The apparatus of claim 3, wherein the source information includes a plurality of source entries for a plurality of source storage devices, wherein each source entry indicates an address range of a source storage device of the plurality of source storage devices having a portion of the transfer data, wherein the destination information includes a plurality of destination entries for a plurality of destination storage devices, corresponding to the source entries, wherein each destination entry indicates destination addresses in a destination storage device of the plurality of destination storage devices to which the portion of the transfer data indicated in a corresponding source entry is transferred.

5. The apparatus of claim 4, wherein each of the source entries further includes a source queue doorbell address in one of the source storage devices and wherein each of the destination entries includes a destination queue doorbell address in one of the destination storage devices, wherein the control logic is further to:

write to a source queue doorbell address indicated in a selected source entry of the source information to cause the source storage device having the source queue doorbell address to transfer a portion of the transfer data indicated in the address range of the selected source entry; and write to a destination queue doorbell address indicated in a selected destination entry of the destination information to cause a destination storage device having the destination queue doorbell address to write the portion of the transfer data to the address range of the destination storage device indicated in the selected destination entry.

6. The apparatus of claim 1, wherein the control logic is further to receive configuration commands from the host processor to extend the memory space of the host processor, wherein the read and the write buffers are configured in mapped addresses in the memory space, and wherein the mapped addresses in the memory space extend a host memory space.

7. The apparatus of claim 1, wherein the control logic is further to receive, from the host processor, configuration commands to cause the control logic to:

configure read and write buffers in the memory space; and configure submission queues in the memory space, wherein the control logic adds the read commands to the submission queues to cause source storage devices to transfer data to the read buffers and adds write commands to submission queues for the transfer data in the write buffers to cause destination storage devices to write the transfer data in the write buffers to the destination storage devices.

8. The apparatus of claim 7, wherein the configuration commands are further to cause the control logic to:

configure queue doorbell addresses in the memory space that point to addresses in the storage devices, wherein writing to one of the queue doorbell addresses for one of the storage devices causes that storage device to access a read or write request included in a submission queue for the storage device.

9. The apparatus of claim 1, wherein the control logic is further to:

receive, from the host processor, mapped memory addresses in the storage devices, wherein in response to receiving the mapped memory addresses, the control logic is to:

configure the read and the write buffers in the memory space; and configure submission and completion queues for the storage devices in the mapped memory addresses in the storage devices, wherein the control logic adds the read commands to at least one submission queue for the source storage device to read the transfer data and adds write commands to at least one submission queue for the destination storage device to transfer the modified transfer data in at least one write buffer to the destination storage device in response to complete returned in at least one of the completion queues to the read commands added to the at least one submission queue.

10. The apparatus of claim 1, further comprising programmable hardware logic coupled to a bus interface further coupled to the host processor and the storage devices.

11. A system connected to a host processor and a plurality of storage devices having storage device controllers, comprising:

a plurality of hardware accelerators configured to operate as a single systolic array to manage read and write operations with respect to a group of the storage devices, wherein the hardware accelerators operate in parallel or serial with respect to the group of the storage devices, and wherein the hardware accelerator is implemented in hardware separate from the storage devices and the storage device controllers of the storage devices, wherein each of the hardware accelerators configured in the single systolic array comprise:

a memory space including read buffers and write buffers for the storage devices; and control logic to:

receive, from the host processor, a command descriptor indicating a source storage device of the group of the storage devices having transfer data to transfer to a destination storage device of the group of the storage devices, an operation code indicating a type of data transfer to be performed between the source storage device and the destination storage device, and a computational task to perform on the transfer data;

send read commands to the source storage device to read the transfer data to at least one read buffer in the memory space;

perform the computational task on the transfer data in the at least one read buffer to process the transfer data and transform to produce modified transfer data; and write the modified transfer data to at least one write buffer in the memory space to cause the modified transfer data to be written to the destination storage device.

12. The system of claim 11, wherein one of the hardware accelerators in the single systolic array receives the command descriptor and forward processing results to at least one other hardware accelerator in the single systolic array to perform processing operations to complete the command descriptor.

13. A system in communication with a host processor, comprising:
    Dual In-line Memory Modules (DIMMs) implementing a memory space of the host processor;
    a plurality of storage devices having storage device controllers; and
    a hardware accelerator, comprising:
        a memory space including read buffers and write buffers for the storage devices providing an extension of the memory space of the host processor, wherein the hardware accelerator is implemented in hardware separate from the storage devices and the storage device controllers of the storage devices; and
        control logic to:
            receive, from the host processor, a command descriptor indicating a source storage device having transfer data to transfer to a destination storage device, an operation code indicating a type of data transfer to be performed between the source storage device and the destination storage device, and a computational task to perform on the transfer data;
            send read commands to the source storage device to read the transfer data to at least one read buffer in the memory space;
            perform the computational task on the transfer data in the at least one read buffer to process the transfer data and transform to produce modified transfer data; and
            write the modified transfer data to at least one write buffer in the memory space to cause the modified transfer data to be written to the destination storage device.

14. The system of claim 13, wherein the command descriptor includes a pointer to information on addresses of the transfer data in the at least one of the source and destination storage devices in a host memory space of the host processor.

15. The system of claim 13, wherein the command descriptor includes a source pointer to source information in a host memory space of the host processor indicating the transfer data in a plurality of source storage devices and a destination pointer to destination information in the host memory space having locations in a plurality of destination storage devices to which the transfer data is transferred.

16. The system of claim 15, wherein the source information includes a plurality of source entries for a plurality of source storage devices, wherein each source entry indicates an address range of a source storage device of the plurality of source storage devices having a portion of the transfer data, wherein the destination information includes a plurality of destination entries for a plurality of destination storage devices, corresponding to the source entries, wherein each destination entry indicates destination addresses in a destination storage device of the plurality of destination storage devices to which the portion of the transfer data indicated in a corresponding source entry is transferred.

17. The system of claim 16, wherein each of the source entries further includes a source queue doorbell address in one of the source storage devices and wherein each of the destination entries includes a destination queue doorbell address in one of the destination storage devices, further comprising:
    write to a source queue doorbell address indicated in a selected source entry of the source information to cause the source storage device having the source queue doorbell address to transfer a portion of the transfer data indicated in the address range of the selected source entry; and
    write to a destination queue doorbell address indicated in a selected destination entry of the destination information to cause a destination storage device having the destination queue doorbell address to write the portion of the transfer data to the address range of the destination storage device indicated in the selected destination entry.

18. The system of claim 13, wherein the control logic is further to receive configuration commands from the host processor to extend the memory space of the host processor, wherein the read and the write buffers are configured in mapped addresses in the memory space, and wherein the mapped addresses in the memory space extend a host memory space.

19. The system of claim 13, wherein the control logic is further to receive, from the host processor, configuration commands to cause the control logic to:
    configure read and write buffers in a memory space; and
    configure submission queues in the memory space, wherein the control logic adds the read commands to the submission queues to cause source storage devices to transfer data to the read buffers and adds write commands to submission queues for the transfer data in the write buffers to cause destination storage devices to write the transfer data in the write buffers to the destination storage devices.

20. A method implemented in a hardware accelerator for transferring data among storage devices having storage device controllers, comprising:
    providing a memory space including read buffers and write buffers for the storage devices, wherein the hardware accelerator is implemented in hardware separate from the storage devices and the storage device controllers of the storage devices;
    receiving, from a host processor, a command descriptor indicating a source storage device having transfer data to transfer to a destination storage device and a computational task to perform on the transfer data, an operation code indicating a type of data transfer to be performed between the source storage device and the destination storage device;
    send read commands to the source storage device to read the transfer data to at least one read buffer in a memory space including read buffers and write buffers for the storage devices;
    performing the computational task on the transfer data in the at least one read buffer to process the transfer data and transform to produce modified transfer data; and
    writing the modified transfer data to at least one write buffer in the memory space to cause the modified transfer data to be written to the at least one destination storage device.

21. The method of claim 20, wherein the command descriptor includes a pointer to information on addresses of the transfer data in the at least one of the source and destination storage devices in a host memory space of the host processor.

22. The method of claim 20, wherein the command descriptor includes a source pointer to source information in a host memory space of the host processor indicating the transfer data in a plurality of source storage devices and a destination pointer to destination information in the host memory space having locations in a plurality of destination storage devices to which the transfer data is transferred.

23. The method of claim 22, wherein the source information includes a plurality of source entries for a plurality of source storage devices, wherein each source entry indicates an address range of a source storage device of the plurality of source storage devices having a portion of the transfer data, wherein the destination information includes a plurality of destination entries for a plurality of destination storage devices, corresponding to the source entries, wherein each destination entry indicates destination addresses in a destination storage device of the plurality of destination storage devices to which the portion of the modified transfer data indicated in a corresponding source entry is transferred.

24. The method of claim 20, further comprising:

receiving configuration commands from the host processor to extend the memory space of the host processor, wherein the read and the write buffers are configured in mapped addresses in the memory space, and wherein the mapped addresses in the memory space extend a host memory space.

25. The method of claim 20, further comprising:

receiving, from the host processor, configuration commands to cause operations comprising:

configuring read and write buffers in a memory space; and configuring submission queues in the memory space, wherein the read commands are added to the submission queues to cause source storage devices to transfer data to the read buffers and adds write commands to submission queues for the transfer data in the write buffers to cause destination storage devices to write the transfer data in the write buffers to the destination storage devices.

\* \* \* \* \*